United States Patent
Guo (10) Patent No.: US 7,765,875 B2
(45) Date of Patent: Aug. 3, 2010

(54) HIGH TEMPERATURE CAPACITIVE STATIC/DYNAMIC PRESSURE SENSORS

(75) Inventor: Shuwen Guo, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 261 days.

(21) Appl. No.: 12/215,735

(22) Filed: Jun. 30, 2008

(65) Prior Publication Data

US 2010/0000326 A1    Jan. 7, 2010

Related U.S. Application Data

(60) Provisional application No. 61/009,715, filed on Dec. 31, 2007.

(51) Int. Cl.
    *G01L 9/12*    (2006.01)
(52) U.S. Cl. ............................. 73/724; 73/718
(58) Field of Classification Search .................. None
    See application file for complete search history.

(56) References Cited

U.S. PATENT DOCUMENTS

| 5,101,165 A | 3/1992 | Rickards |
| 5,539,292 A * | 7/1996 | Vranish ............... 318/568.21 |
| 5,546,005 A | 8/1996 | Rauchwerger |
| 5,692,690 A * | 12/1997 | Gulledge et al. ......... 242/474.7 |
| 5,892,365 A | 4/1999 | Bailleul et al. |
| 5,992,240 A * | 11/1999 | Tsuruoka et al. ............... 73/718 |
| 6,148,674 A | 11/2000 | Park et al. |
| 6,365,055 B1 * | 4/2002 | Weber et al. .................... 216/2 |
| 6,564,643 B1 | 5/2003 | Horie et al. |
| 6,989,679 B2 | 1/2006 | Lieder et al. |
| 7,258,806 B1 | 8/2007 | Ho |

OTHER PUBLICATIONS

PIWG website http://www.piwg.org/sensor/sensor_hdpressure.html (accessed Jan. 11, 2010).

* cited by examiner

*Primary Examiner*—Andre J Allen
(74) *Attorney, Agent, or Firm*—Scott D. Wofsy; Edwards Angell Palmer & Dodge LLP (57) ABSTRACT

Disclosed is a capacitive pressure probe for high temperature applications, such as for use in a gas turbine engine. The capacitive probe or pressure sensor of the present invention includes, inter alia, a sensor housing that defines an interior sensing chamber having a pressure port and an interior reference chamber positioned adjacent to a sensing electrode. The reference chamber is separated from the sensing chamber by a deflectable diaphragm made from Haynes 230 alloy, wherein the deflection of the diaphragm in response to an applied pressure in the sensing chamber corresponds to a change in capacitance value detected by the sensing electrode.

24 Claims, 12 Drawing Sheets

Sensor output versus pressure (15 psi to 250 psi) and temperature 19 C to 750 C

HIGH TEMPERATURE CAPACITIVE STATIC/DYNAMIC PRESSURE SENSORS

CROSS-REFERENCE TO RELATED APPLICATIONS

The subject invention claims the benefit of priority to U.S. Provisional Patent Application Ser. No. 61/009,715, entitled High Temperature Capacitive Pressure Sensor, and filed on Dec. 31, 2007, the disclosure of which is herein incorporated by reference in its entirety.

BACKGROUND OF THE INVENTION

1. Field of the Invention

The subject invention is directed to capacitive pressure sensor, and more particularly, to high temperature capacitive static/dynamic pressure sensors, such as sensors or microphones for detecting acoustic pressure waves in a gas turbine engine, which employs a diaphragm made from a material exhibiting high thermal strength, thermal stability and oxidation resistance at elevated temperatures.

2. Description of Related Art

Capacitive pressure sensors are well known in the art, as disclosed for example in U.S. Pat. No. 6,148,674, the disclosure of which is herein incorporated by reference in its entirety. However, these devices have limited applicability at elevated temperatures. In particular, since the capacitance of prior art pressure sensors are normally in the picoFarad (pF) range, they are susceptible to stray capacitance and other environmental conditions. This makes it difficult to develop high temperature capacitive pressure sensors for use in harsh environment applications, such as, gas turbine applications. Indeed, there are currently no commercially available capacitive pressure sensors capable of operating above 350° C.

This obstacle has been overcome, in part, by a combination of guard techniques and frequency modulation (FM) capacitive transmitting technology. In order to achieve accurate and reliable gauging, all stray capacitance has to be excluded in the signal pick-off circuit. This can be prevented by a technique called guarding. Guarding is accomplished by surrounding the sensing electrode area with a non-sensing conductor that is kept at the same voltage as the sensing area itself. This technique is also used to guard a tri-axial cable connecting the pressure detector to a signal conditioning circuit. As a result, there is no loss of the input signal, even though the cable may be as long as up to 10 meters.

Another factor that influences capacitive pick-off signal is the resistance of the dielectric material, which decreases as the temperature increases. This makes the direct current (DC) signal difficult to detect at high temperatures. A frequency modulation (FM) capacitive measurement system resolves this problem. Use of FM makes the system sensitive to carrier frequency variations and ignores ESD (Electro Static Discharge) or EM (Electro Magnetic) varying fields.

U.S. Pat. No. 7,258,806 to Ho, the disclosure of which is herein incorporated by reference, discloses a diaphragm for a capacitive microphone device. The diaphragm is made using a first substrate that has a dielectric layer formed thereon. Then a second metallic diaphragm layer is applied to the substrate over the dielectric layer. It is not uncommon to manufacture a diaphragm using layers of materials in order to improve the sensing characteristics of the microphone. However, laminar diaphragms are expensive to manufacture and are not capable of operating in high temperature environments.

A solution to these deficiencies has been to employ an all metal diaphragm to minimize the thermal mismatch between the diaphragm and the substrate. However, one of the drawbacks of a metal diaphragm in a pressure sensor or microphone is temperature hysteresis and pressure hysteresis at high temperature. A useful capacitive pressure sensor having a diaphragm made of Inconel 750 has been manufactured and tested by the present inventors. A temperature cycle test from −55° C. to 500° C. at pressure from 15 psi to 600 psi shows that the temperature hysteresis in such a device is approximately 0.76% and the pressure hysteresis is less approximately 1.3% without any thermal compensation. These values are relatively large compared to a silicon diaphragm, which is usually less than 0.25%. In order to reduce the hysteresis effect, a better high temperature diaphragm material is desired. The subject invention is directed to a pressure probe having a diaphragm made of a material that overcomes the drawbacks of the prior art and constructed to provide a more accurate measurement of the pressure (dynamic or static) at high temperatures.

SUMMARY OF THE INVENTION

The subject invention is directed to new and useful capacitive pressure sensors for high temperature applications, such as for use in a gas turbine engine. Certain constructions of the capacitive probes or pressure sensors of the present invention include, inter alia, a sensor housing that defines an interior sensing chamber having a pressure port and an interior reference chamber positioned adjacent to a sensing electrode. The reference chamber is separated from the sensing chamber by a deflectable diaphragm made from Haynes 230 alloy, wherein the deflection of the diaphragm in response to an applied pressure in the sensing chamber corresponds to a change in capacitance value detected by the sensing electrode. Preferably, the reference chamber is sealed in a vacuum with a pressure less than 10 mTorr.

It is envisioned that a gap is provided within the reference chamber between the sensing electrode and the diaphragm, and the gap is between about 67 µm and 100 µm.

Preferably, the sensing electrode is shielded from signal line parasitic capacitance to ground. In certain embodiments, the sensing electrode is shielded from signal line parasitic capacitance to ground by a guard ring. Still further, it is envisioned that the guard ring is driven by a voltage potential equal to a voltage potential running through the signal line. Moreover, in certain constructions, a ceramic insulator is disposed between the sensing electrode and guard ring.

Preferably, the capacitive pressure sensor of the present invention further includes a mechanism for reading a detected change in capacitance upon deflection of the diaphragm so as to obtain a pressure measurement.

In certain preferred embodiments, the pressure sensor further includes a venting conduit that provides communication between the sensing chamber and the reference chamber. It is envisioned that a valve can be associated with the venting conduit for restricting the communication between the sensing chamber and the reference chamber.

The present invention is also directed to a capacitive dynamic pressure microphone that includes, inter alia, a sensor housing that defines an interior sensing chamber having an open pressure port and an enclosed interior reference chamber accommodating a sensing electrode. The microphone further includes a deflectable diaphragm that separates the reference chamber from the sensing chamber and is spaced apart from the sensing electrode by a predetermined gap distance.

Still further the microphone includes a venting conduit that provides for communication between the sensing chamber and the reference chamber for maintaining a balanced static background pressure therebetween. The venting conduit is configured so that a change in pressure in the sensing chamber leads ahead of a corresponding change in pressure in the reference chamber by a predetermined time period. Preferably, a pressure differential between the sensing chamber and the reference chamber over the time period causes a corresponding change in the deflection of the diaphragm over the same time period, causing a corresponding change in the gap distance over the time period, resulting in a corresponding change in the capacitance value detected by the sensing electrode over said time period.

In certain embodiments, the deflectable diaphragm is constructed from a material that exhibits a high thermal strength, a thermal stability and oxidation resistance at temperatures in excess of about 750° C. Preferably, the deflectable diaphragm is constructed from a material that exhibits a high thermal strength and a thermal stability at temperatures up to about 1150° C. Still further, in a preferred the deflectable diaphragm is constructed from Haynes 230 alloy.

In certain embodiment of the inventive microphone, a gap is provided within the reference chamber between the sensing electrode and the diaphragm. The gap can range between about 20 μm and about 200 μm, and is preferably between about 67 μm and 100 μm.

Preferably, the sensing electrode is shielded from signal line parasitic capacitance to ground. In certain embodiments, the sensing electrode is shielded from signal line parasitic capacitance to ground by a guard ring. Still further, it is envisioned that the guard ring is driven by a voltage potential equal to a voltage potential running through the signal line. Moreover, in certain constructions, a ceramic insulator is disposed between the sensing electrode and guard ring.

Preferably, the capacitive pressure microphone of the present invention further includes a mechanism for reading a detected change in capacitance upon deflection of the diaphragm so as to obtain a pressure measurement.

In certain preferred embodiments, the microphone further includes a valve associated with the venting conduit for restricting the communication between the sensing chamber and the reference chamber.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the capacitive pressure sensors of the subject invention without undue experimentation, preferred embodiments thereof will be described in detail hereinbelow with reference to certain figures, wherein.

DETAILED DESCRIPTION OF PREFERRED EMBODIMENTS

Figure 1:
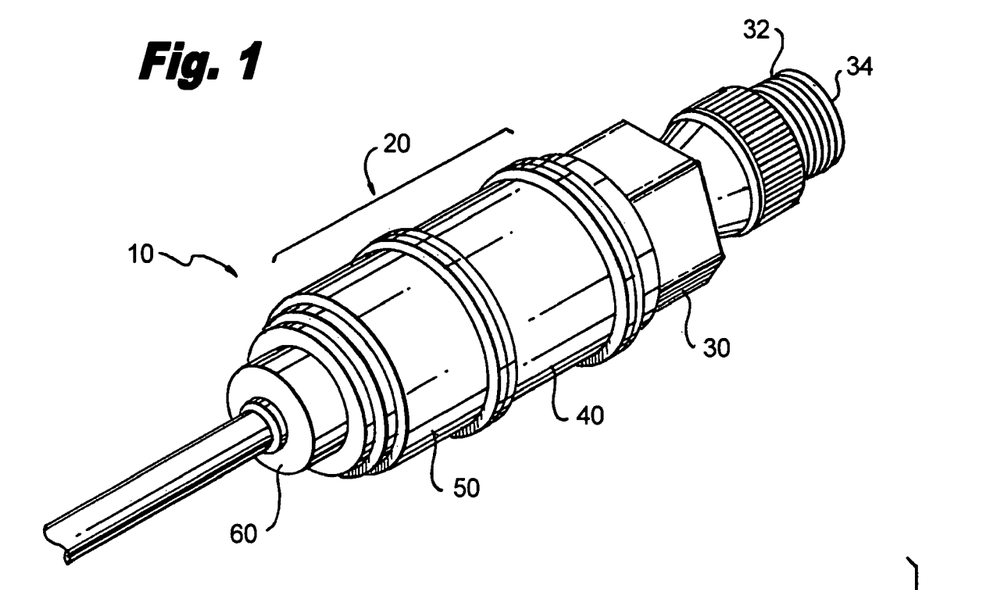
FIG. 1 is a perspective view of a capacitive pressure sensor constructed in accordance with a preferred embodiment of the subject invention.

Referring now to the drawings wherein similar reference numerals identify similar structural features or aspects of the capacitive sensors of the subject invention, there is illustrated in FIG. 1, a capacitive probe or pressure sensor constructed in accordance with a preferred embodiment of the subject invention and designated generally by reference numeral 10. Pressure sensor 10 is adapted and configured for high temperature applications, such as for use in a gas turbine engine.

Figure 2:
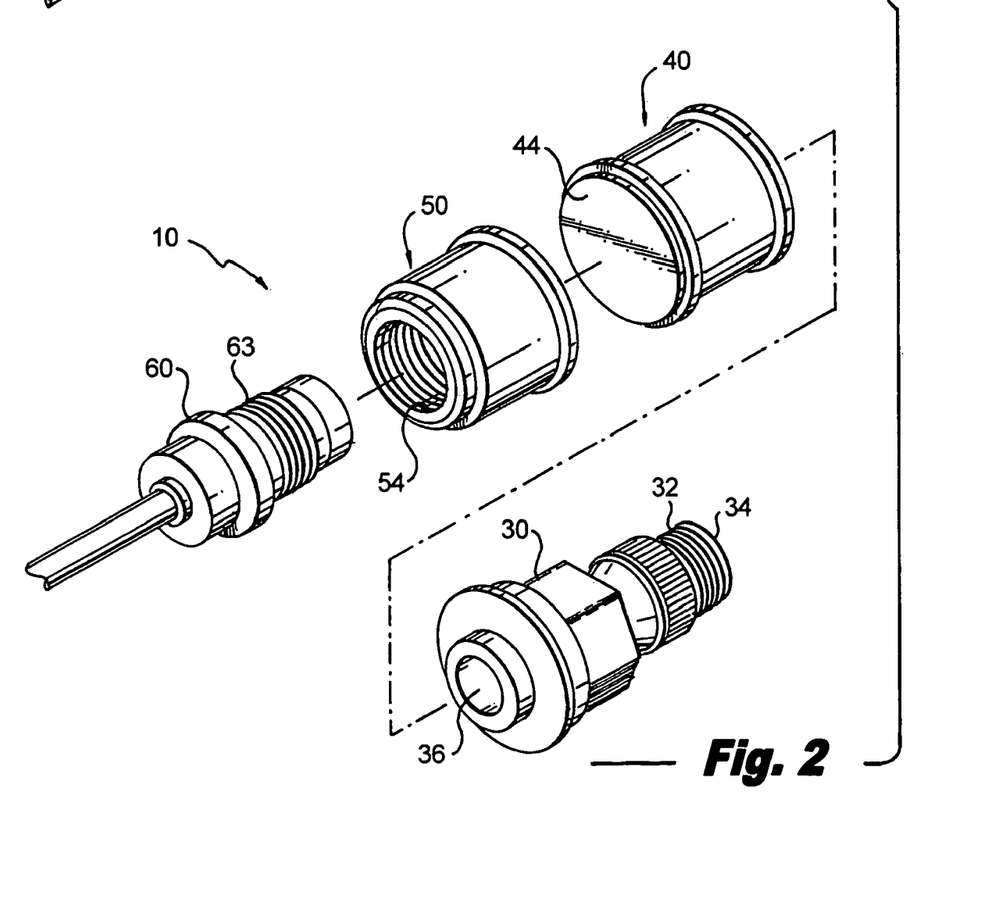
FIG. 2 is a perspective view of the capacitive pressure sensor of FIG. 1 with parts separated for ease of illustration.
Figure 3:
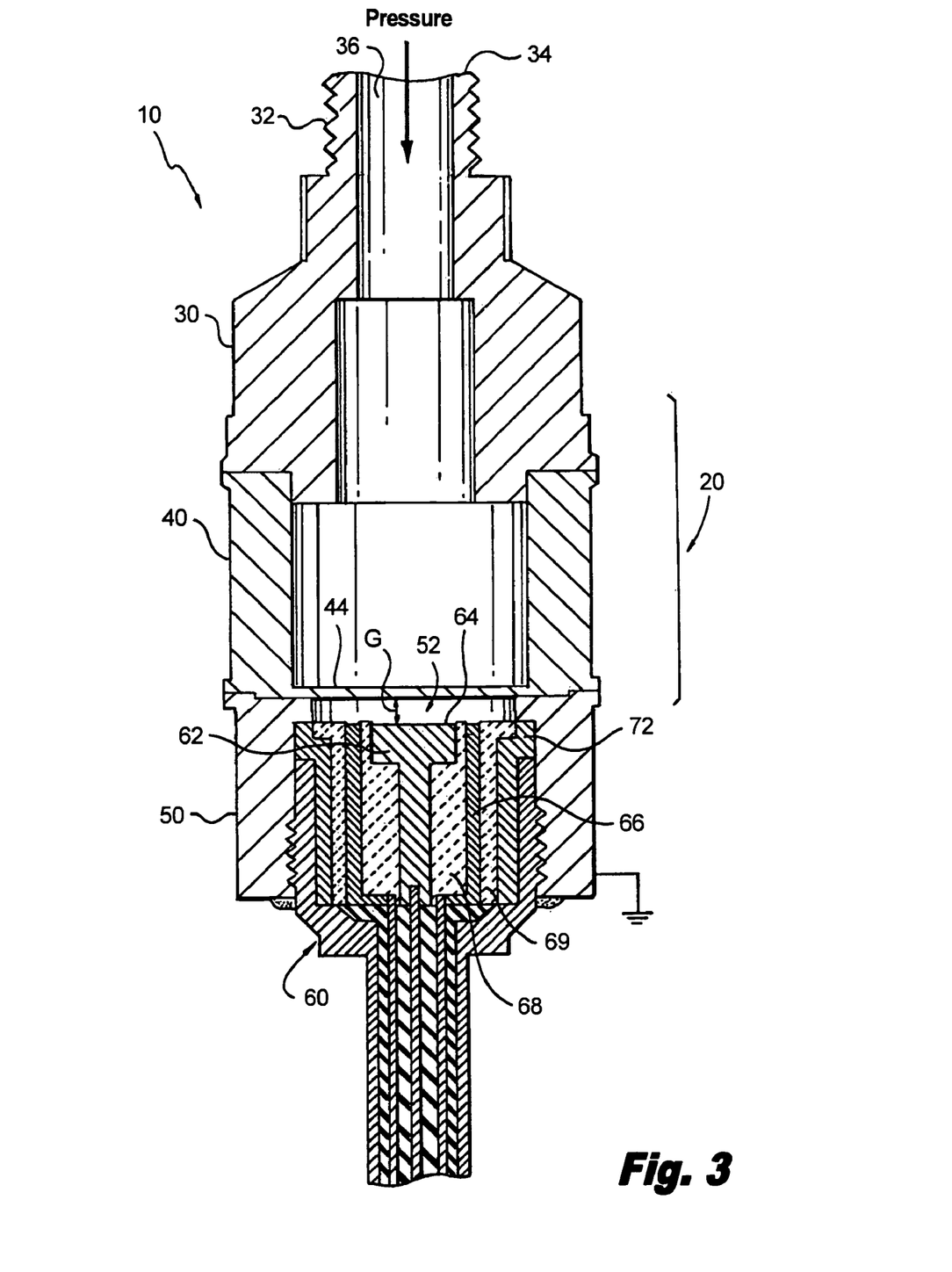
FIG. 3 is a cross sectional view of the capacitive pressure sensor of FIGS. 1 and 2.

Referring to FIGS. 1 through 3, pressure sensor 10 includes a housing assembly 20 having a mounting section 30, a diaphragm section 40, and electrode support section 50. The electrode support section is adapted and configured for receiving an electrode assembly 60.

The mounting section 30 of the housing assembly 20 includes a series of threads 32 associated with one end 34 thereof. The threads 32 can be used to connect the sensor 10 to the pressure source to be measured. For example, the threads 32 can be used to connect that sensor 10 to the housing of a combustor. Those skilled in the art will readily appreciate that other mechanisms for connecting the sensor to the pressure source can be employed without departing from the scope of the present invention.

As can be seen in FIG. 3, the mounting section 30 defines a pressure port 36 that extends over its entire length. The pressure port 36 of the mounting section 30 terminates in a sensing chamber 42 formed in the diaphragm section 40. The diaphragm section 40 includes a flexible diaphragm 44 positioned adjacent to the sensing chamber 42. The diaphragm 44 will be discussed in more detail hereinbelow.

Referring again to FIG. 3, when the electrode assembly 60 is inserted into the electrode support section 50, a reference chamber 52 is formed between end 64 of the electrode 62 and the diaphragm 44. Electrode assembly 60 has a series of threads 63 formed on its outer periphery which are adapted and configured for mating with a series of threads 54 formed on an inner diameter of the electrode support section 50 of housing 20. One the electrode assembly is threaded into the electrode support section the two parts can be welded together as shown in order to improve the sealing of the reference chamber 52.

In the embodiment disclosed herein, the three component parts of the housing assembly 20 are made of the same alloy and are welded together into a unitary structure. The unit has a very good hermetic seal and the pressure leak rate is less than $10^{-10}$ atm cc/sec at room temperature. However, those skilled in the art will readily appreciate that any number of parts can be used to make up the sensor's housing assembly 20 without departing for the spirit and scope of the present invention. For example, although FIG. 3 illustrates that the diaphragm section 40 of the housing assembly 20 is made from a single part, it is envisioned that the flexible diaphragm 44 can be formed as a separate piece that is later welded onto a cylindrical main body portion.

With continuing reference to FIG. 3, which illustrates that the reference chamber 52 is sealed and separated from the sensing chamber 42 by the deflectable diaphragm 44. The reference chamber 52 is sealed in a vacuum with a pressure less than 10 mTorr. The diaphragm 44 is constructed from a material exhibiting high thermal strength, thermal stability and oxidation resistance at elevated temperatures. The deflection of the diaphragm 44 in response to an applied pressure in the sensing chamber 42 corresponds to a capacitance value detected by the sensing electrode 62. Preferably, a system is provided for remotely reading a detected change in capacitance upon deflection of the diaphragm 44, so as to obtain a pressure measurement, as shown for example in FIGS. 7 and 8 (discussed hereinbelow).

In accordance with a preferred embodiment of the subject invention, the deflectable diaphragm 44 is constructed from a material exhibiting high thermal strength, thermal stability and oxidation resistance at temperatures in excess of about 750° C. Preferably, the deflectable diaphragm is constructed from a material exhibiting high thermal strength, thermal stability and oxidation resistance at temperatures up to about 1000° C. In a preferred embodiment of the present invention, the deflectable diaphragm is constructed from Haynes 230 alloy. Still further, in certain preferred constructions, the thickness of the diaphragm is about 0.018". This thickness is preferred for a static pressure sensor with an input range of about 600 psi. The thickness of the diaphragm is varied depending of the pressure range for the sensor. For example, for sensor having a pressure input of 10 psi, a diaphragm having a thickness of about 0.003" could be used.

As best seen in FIG. 3, a gap "G" is provided within the reference chamber 52 between the sensing electrode 62 and the diaphragm 44. The gap is between about 67 μm and 100 μm. The gap distance corresponds to a certain range of capacitance values, for example, 0.93 pF to 0.63 pF.

The sensing electrode 62 is shielded from signal line parasitic capacitance to ground. In particular, the sensing electrode 62 is shielded from signal line parasitic capacitance to ground by a guard ring 66. Preferably, the guard ring 66 is driven by a voltage potential equal to a voltage potential running through the signal line. For example, an inverter buffer circuit can be used. Furthermore, a ceramic insulator 68 is disposed between the sensing electrode 62 and guard ring 66. Another ceramic insulator 69 surrounds the guard ring 66 and a stainless steel shield 72 surrounds insulator 69.

Haynes alloy 230 has excellent high temperature strength, oxidation resistance and long-term thermal stability. For these reasons it is often used in aerospace, chemical processing and high temperature heating applications. The thermal properties of Haynes alloy 230 can be readily compared to the thermal properties of Inconel 750, which is commonly used as a material for mechanical diaphragms in industrial applications, to show its advantages. A comparison of modulus of elasticity and thermal expansion coefficient versus temperature for both Haynes 230 and Inconel 750 is summarized in Table 1.0 and Table 2.0.

As shown in Table 1.0, the value of the modulus of elasticity of Inconel 750 drops approximately 40% when it heats up from 26.7° C. to 816° C., while the modulus of elasticity of Haynes 230 alloy drops approximately 29% when it heats up from 26.7° C. to 1000° C. This means that Haynes 230 has much better thermal strength than Inconel 750. In Table 2.0, the difference of thermal expansion coefficient for Inconel 750 between a temperature range of 26.7° C. to 93° C. and a temperature range of 26.7° C. to 871° C. is about 25.3%. In comparison, for Haynes 230, the difference of thermal expansion coefficient is about 21.1% between a temperature range of 25° C. to 100° C. and a temperature range of 25° C. to 1000° C. This data establishes that Haynes 230 alloy exhibits better thermal strength and thermal stability than Inconel 750.

TABLE 1.0

Comparison of Dynamic Modulus of Elasticity Between Inconel 750 and Haynes 230

| Inconel 750 | | Haynes 230 | |
| --- | --- | --- | --- |
| Temperature (° C.) | Modulus (GPa) | Temperature (° C.) | Modulus (GPa) |
| 26.7 | 213.7 | 25 | 211 |
| 260 | 197.9 | 100 | 207 |
| 538 | 172.4 | 200 | 202 |
| 732 | 144.8 | 300 | 196 |
| 816 | 127.6 | 400 | 190 |
| | | 500 | 184 |
| | | 600 | 177 |
| | | 700 | 171 |
| | | 800 | 164 |
| | | 900 | 157 |
| | | 1000 | 150 |

TABLE 2.0

Comparison of Thermal Expansion Coefficient Between Inconel 750 and Haynes 230

| Inconel 750 | | Haynes 230 | |
| --- | --- | --- | --- |
| Temperature Range (° C.) | Thermal expansion coefficient ($10^{-6}$ m/m-° C.) | Temperature range (° C.) | Thermal expansion coefficient ($10^{-6}$ m/m-° C.) |
| 26.7 to 93 | 12.1 | 25 to 100 | 12.7 |
| 26.7 to 360 | 13.5 | 25 to 200 | 13.0 |
| 26.7 to 538 | 14.2 | 25 to 300 | 13.3 |
| 26.7 to 649 | 14.6 | 25 to 400 | 13.7 |
| 26.7 to 871 | 16.2 | 25 to 500 | 14.0 |
| | | 25 to 600 | 14.4 |
| | | 25 to 700 | 14.8 |
| | | 25 to 800 | 15.2 |
| | | 25 to 900 | 15.7 |
| | | 25 to 1000 | 16.1 |

In accordance with the subject invention, a capacitive pressure sensor based on Haynes 230 alloy is not only highly resistant to extreme temperature, but it also retains high accuracy and high stability at temperatures up to about 800° C.

With sensor 10 a relatively small capacitance variation can be precisely measured and transmitted to a remote readout electronic circuit through, for example, a 3 meter long tri-axial cable. As mentioned above, to eliminate signal line parasitic capacitance to ground, a guard ring 66 is driven by the same voltage potential as that which is running through the signal line. Therefore, there is no AC current between the signal line and the guard ring 66, and any capacitance between the two does not affect the charge transfer through the signal line. This means that the capacitance between the guard ring 66 and the signal line does not have any contribution to the output.

Figure 7:
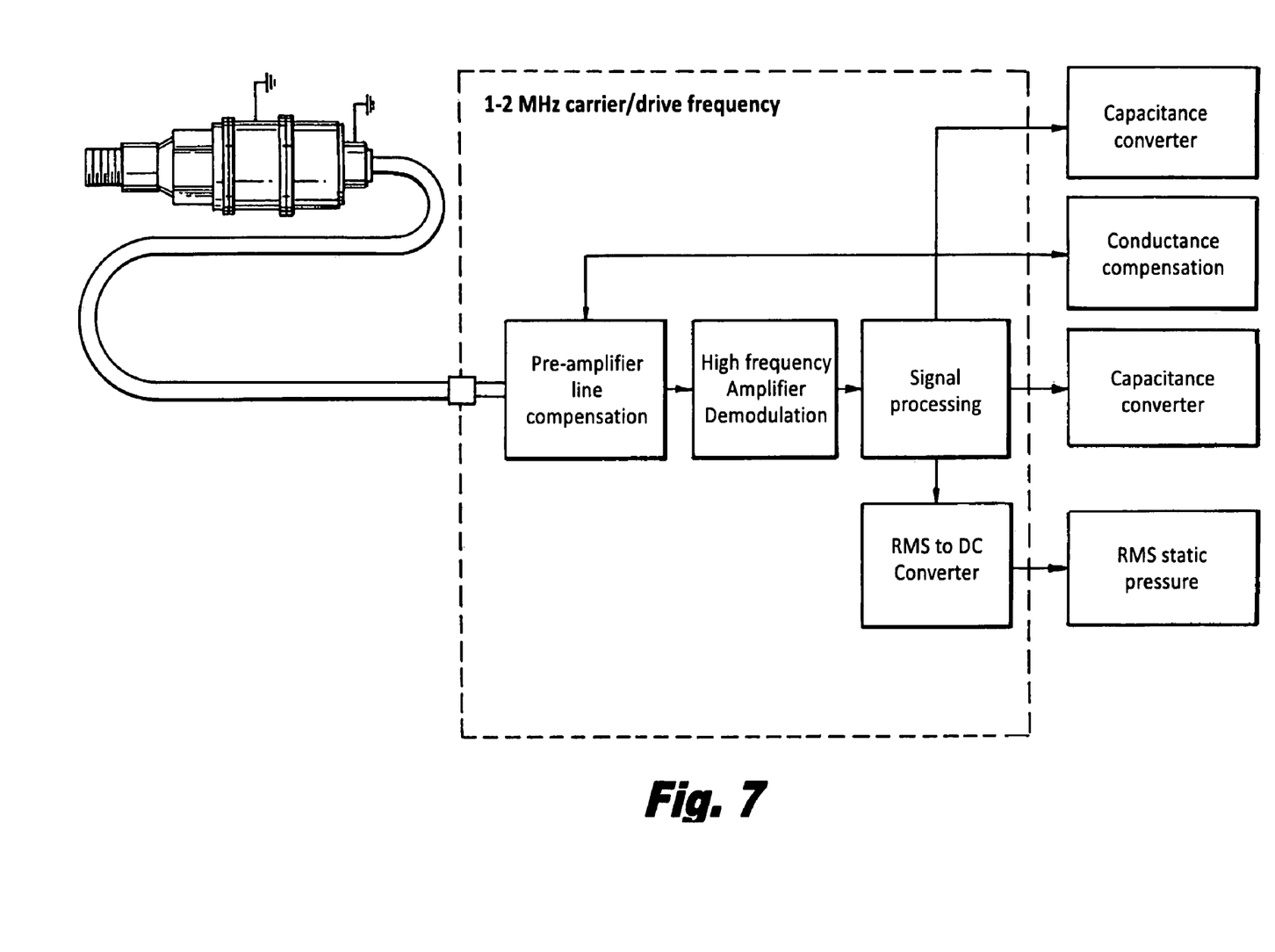
FIG. 7 is a schematic of a capacitive remote readout system based on MC900 modular electronics for both dynamic and static pressure measurement.

Referring to FIG. 7, there is shown a schematic of a capacitive remote readout system 40 based upon MC900 modular electronics made by the French company Fogale nanotech. The thermal drift for the system is 0.002% per ° C. and the bandwidth is about 10 kHz. The readout system 40 is suitable for both dynamic and static pressure measurement.

Figure 8:
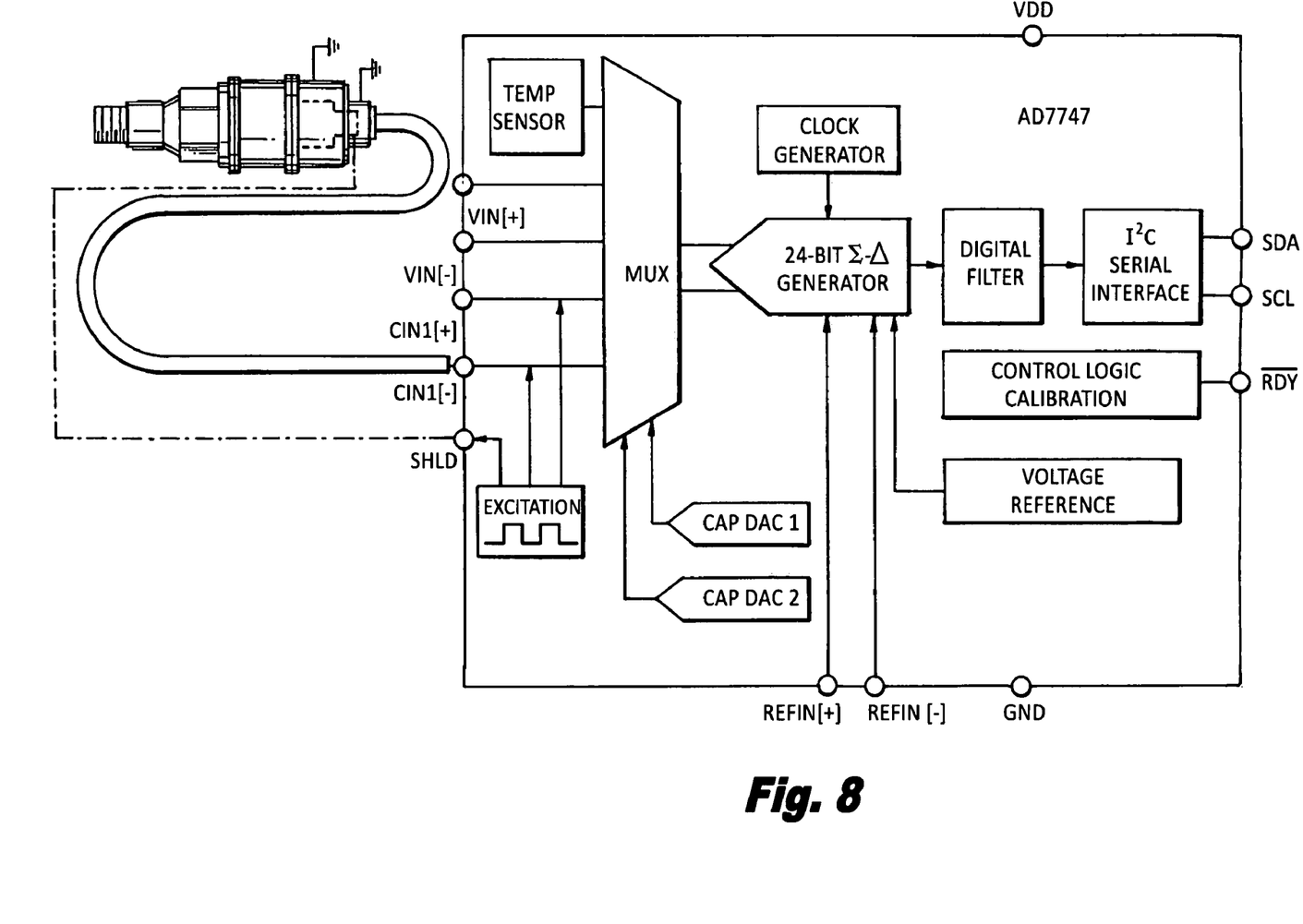
FIG. 8 is a schematic of a capacitive remote readout system based on a AD7747 capacitance-to-digital converter chip for static pressure measurement.

Referring to FIG. 8, there is shown a schematic of another capacitive readout system 50, which is based on a capacitance-to-digital converter ASIC chip, referred to as AD7747, which is made by Analog Devices. The resolution of the AD7747 chip is down to 20 aF ($10^{-18}$ F) and it has an accuracy in the range of 4~10 fF ($10^{-15}$ F). Full-scale (changing) capacitance range is ±8 pF. The update rate of the chip is 5 Hz to 45 Hz. However, it is only suitable for static and low frequency pressure measurement.

The capacitive pressure sensor of the subject invention has been fully characterized over temperature cycle tests. The temperature profile for the test was as follows, wherein the time period for each temperature point extended for about 45 minutes: 25° C.→200° C.→350° C.→500° C.→350° C.→200° C.→25° C.→−55° C.→25° C. There were thirteen (13) pressure points measured at each temperature point, including: 15 psi→100 psi→200 psi→300 psi→400 psi→500 psi→600 psi→500 psi→400 psi→300 psi→200 psi→100 psi→15 psi.

Figure 9:
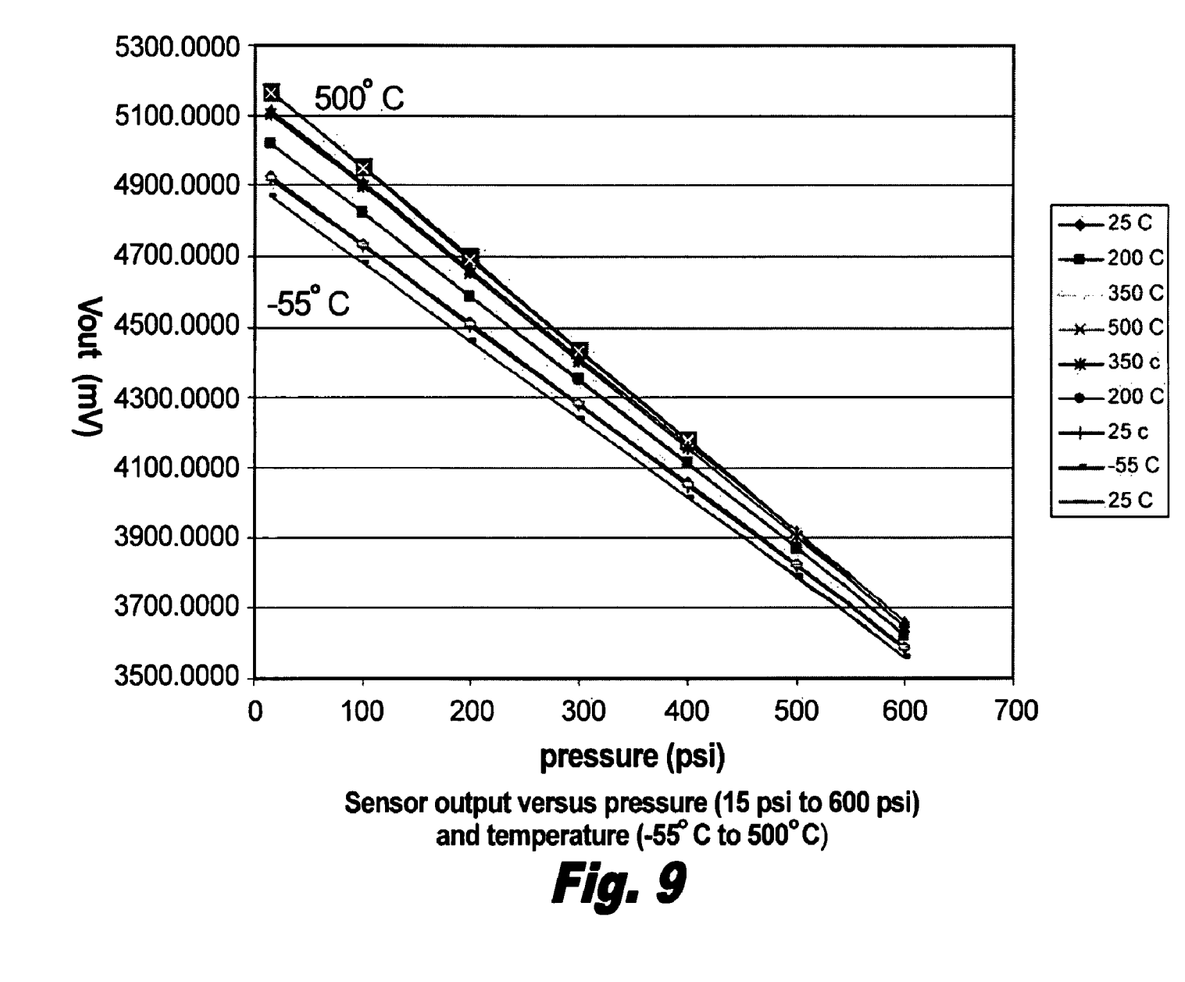
FIG. 9 is a graph showing sensor output versus pressure (15 psi to 600 psi) and temperature (−55° C. to 500° C.) for a preferred embodiment of the subject invention.

A typical sensor output versus pressure (15 psi to 600 psi) and temperature (−55° C. to 500° C.) is shown graphically in FIG. 9. The output is relatively linear over the entire temperature and pressure range. The temperature hysteresis is about 0.367% F.S. (full scale) and pressure hysteresis is about 0.46% F.S. (full scale). The performance data over −55° C. to 500° C. is summarized below in Table 3.0.

TABLE 3.0

Sensor Performance Summary
First Prototype High Temperature Capacitive
Pressure Sensor Based on Haynes 230 Diaphragm.
Unit Performance Summary

| Parameter | Value (min) | Value (max) | Units |
|---|---|---|---|
| Vnull | | | |
| @ Cold (−55° C.) | 4868.541 | | mV |
| @ Hot (500° C.) | 5168.346 | | mV |
| @ Room (25° C.) | 4917.708 | | mV |
| Span | 15 | 600 | psi |
| @ Cold (−55° C.) | −1309.189 | | mV |
| @ Hot (500° C.) | −1523.344 | | mV |
| @ Room | −1333.840 | | mV |
| Temperature range | −55 | 500 | ° C. |
| Straight-Line Best Fit Error - Vfs | −1.324% | 1.699% | % Span |

TABLE 3.0-continued

Sensor Performance Summary
First Prototype High Temperature Capacitive
Pressure Sensor Based on Haynes 230 Diaphragm.
Unit Performance Summary

| Parameter | Value (min) | Value (max) | Units |
|---|---|---|---|
| Straight-Line Best Fit Error - Vnull | −0.959% | 0.961% | % Span |
| Vout, Pressure Hysteresis | −0.460% | 0.035% | % Span |
| Vout, Temperature Hysteresis | | 0.367% | % Span |
| Vout, Zero Repeatability | −0.474% | 0.009% | % Span |
| RSS | | 0.756% | % Span |
| Hot Temperature Repeatability | 0.26% | 0.48% | % Span |

Since the maximum temperature of current temperature cycling ovens is about 500° C., a different furnace was used if temperature was to be above 500° C. In order to test the maximum temperature capability, the Haynes 230 based capacitive pressure sensor of the subject invention was tested in a higher temperature but less controllable furnace. Therefore, the performance data from 500° C. to 750° C. is coarsely characterized based on a manual data recording procedure.

The temperature profile in this furnace was as follows, wherein the time period for each temperature point extended for about 45 minutes: 500° C.→600° C.→700° C.→750° C.→700° C.→600° C.→500° C.→Room-temp ~19° C. There were eleven (11) pressure points measured at each temperature, and they were as follows: 15 psi→50 psi→100 psi→150 psi→200 psi→250 psi→200 psi→150 psi→100 psi→50 psi→15 psi.

Figure 10:
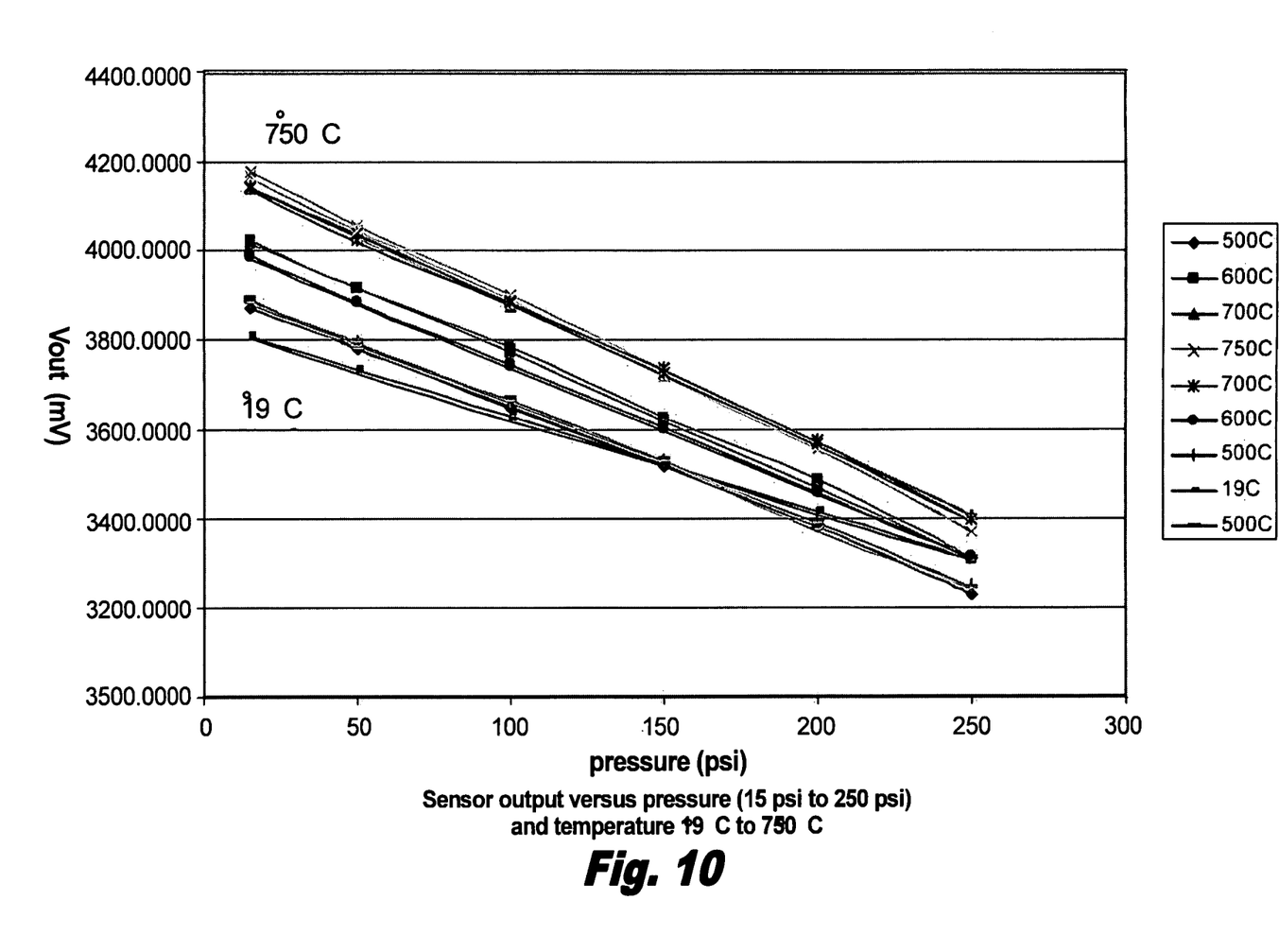
FIG. 10 is a graph showing sensor output versus pressure (15 psi to 250 psi) and temperature (19° C. to 750° C.) for a preferred embodiment of the subject invention.

The result of sensor output versus pressure (15 psi to 250 psi) and temperature (19° C. to 750° C.) is shown graphically in FIG. 10. The output of the sensor is still linear. However, there is relatively larger hysteresis. The temperature hysteresis is about 1.25% F.S. (full scale) and pressure hysteresis is about 2.1% F.S. (full scale). The sensor was still functional after 48 hours of continuous testing at 750° C.

A performance comparison between Inconel 750 based and Haynes 230 based pressure sensors is set forth below in Table 4.0. Both sensors have gone through the same temperature cycle profile. As shown, the Haynes 230 based sensor has superior performance over the Inconel 750 based pressure sensor. Moreover, there is no data on the Inconel 750 based sensor for temperature up to 750° C. because its dynamic modulus of elasticity decreases too much at higher temperature.

TABLE 4.0

Performance Comparison Between Inconel 750 Based
Pressure Sensor and Haynes 230 Based Pressure Sensor Over Pressure
Range of 15 psi to 600 psi and Temperature Range of −55° C. to 500° C.

| | Inconel 750 | Haynes 230 |
|---|---|---|
| Temperature Hysteresis | 0.76% F.S. | 0.367% F.S. |
| Pressure Hysteresis | 1.3% F.S. | 0.460% F.S. |

In sum, a capacitive pressure sensor made of Haynes 230 alloy has been built and fully characterized in two different furnaces over temperature range from −55° C. to 500° C. and from 21° C. to 750° C. The capacitance change over pressure has been measured with a remote readout system through a three-meter long tri-axial cable. The accuracy is better than 0.5% over a temperature range of −55° C. to 500° C. and about 2.1% over a temperature range of 20° C. to 750° C. without any temperature compensation. The sensor was still functional after 48 hours of testing at 750° C. It is thus suitable for gas turbine engine control applications.

Figure 4:
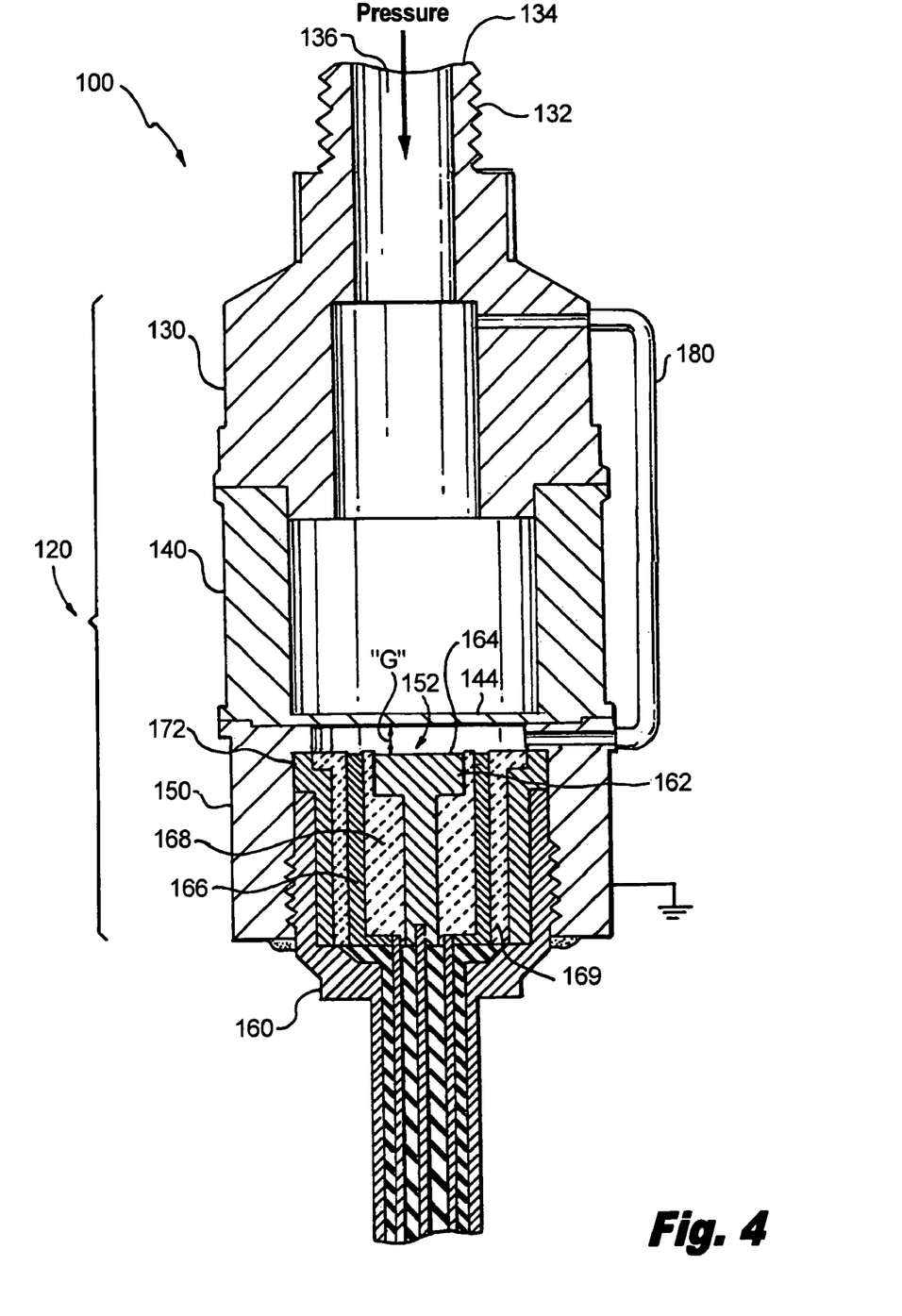
FIG. 4 is a cross sectional view of a capacitive microphone constructed in accordance with a preferred embodiment of the present invention.

Referring now to FIG. 4, there is illustrated a capacitive pressure probe or microphone constructed in accordance with a preferred embodiment of the subject invention and designated generally by reference numeral 100. Microphone 100 is adapted and configured for high temperature applications, such as for use in a gas turbine engine.

Like sensor 10, microphone 100 includes a housing assembly 120 having a mounting section 130, a diaphragm section 140, and electrode support section 150. The electrode support section 150 is adapted and configured for receiving an electrode assembly 160.

The mounting section 130 of the housing assembly 120 includes a series of threads 132 associated with end 134. The threads 132 can be used to connect the microphone 100 to the pressure source to be measured. For example, the threads 132 can be used to connect that microphone 100 to the housing of a combustor.

The mounting section 130 defines a pressure port 136 that extends over its entire length. The pressure port 136 of the mounting section 130 terminates in a sensing chamber 142 formed in the diaphragm section 140. The diaphragm section 140 includes a flexible diaphragm 144 positioned adjacent to the sensing chamber 142. The diaphragm 144 will be discussed in more detail hereinbelow.

When the electrode assembly 160 is inserted into the electrode support section 150, a reference chamber 152 is formed between end 164 of the electrode 162 and the diaphragm 144.

As noted previously with respect to sensor 10, the component parts of the housing assembly 120 are made of the same alloy and are welded together into a unitary structure. The unit has a very good hermetic seal and the pressure leak rate is less than $10^{-10}$ atm cc/sec at room temperature. However, those skilled in the art will readily appreciate that any number of parts can be used to make up the sensor's housing assembly 120 without departing for the spirit and scope of the present invention.

The diaphragm 144 is constructed from a material exhibiting high thermal strength, thermal stability and oxidation resistance at elevated temperatures. The deflection of the diaphragm 144 in response to an applied pressure in the sensing chamber 142 corresponds to a capacitance value detected by the sensing electrode 162. Preferably, a system is provided for remotely reading a detected change in capacitance upon deflection of the diaphragm 144, so as to obtain a pressure measurement, as shown for example in FIGS. 7 and 8 (discussed supra).

In accordance with a preferred embodiment of the subject invention, the deflectable diaphragm 144 is constructed from a material exhibiting high thermal strength, thermal stability and oxidation resistance at temperatures in excess of about 750° C. Preferably, the deflectable diaphragm is constructed from a material exhibiting high thermal strength, thermal stability and oxidation resistance at temperatures up to about 1000° C. More preferably, the deflectable diaphragm is constructed from Haynes 230 alloy. In certain constructions, the diaphragm is about between 80 μm to 100 μm think.

A gap "G" is provided within the reference chamber 152 between the sensing electrode 162 and the diaphragm 144. The gap is between about 67 μm and 100 μm. The gap distance corresponds to a certain range of capacitance values, for example, 0.93 pF to 0.63 pF.

Similar to sensor 10, in microphone 100, the sensing electrode 162 is shielded from signal line parasitic capacitance to ground. In particular, the sensing electrode 162 is shielded from signal line parasitic capacitance to ground by a guard ring 166. Preferably, the guard ring 166 is driven by a voltage potential equal to a voltage potential running through the signal line. For example, an inverter buffer circuit can be used. Furthermore, a ceramic insulator 168 is disposed between the sensing electrode 162 and guard ring 166. Another ceramic insulator 169 surrounds the guard ring 166 and a stainless steel shield 172 surrounds insulator 169.

In contrast to sensor 10, microphone 100 includes a ventilation tube 180 extending between the sensing chamber 142 and the reference chamber 152. The tube 180 maintains the pressure balance on both sides of the diaphragm 144. However, the diaphragm 144 will still respond to a dynamic pressure change since the thin tube 180 will add a delay of acoustic signal to the other side of the diaphragm 144. The tube 180 will enable the microphone to respond to an acoustic signal over a high background pressure up to 800 psi. As noted above, in a preferred construction, the diaphragm is between about 80-100 μm thick with a diameter of about 0.4 inch. The gap between the bottom electrode and the diaphragm is between about 67 μm and 100 μm which corresponds to a capacitance value of 0.93 pF to 0.63 pF.

Figure 5:
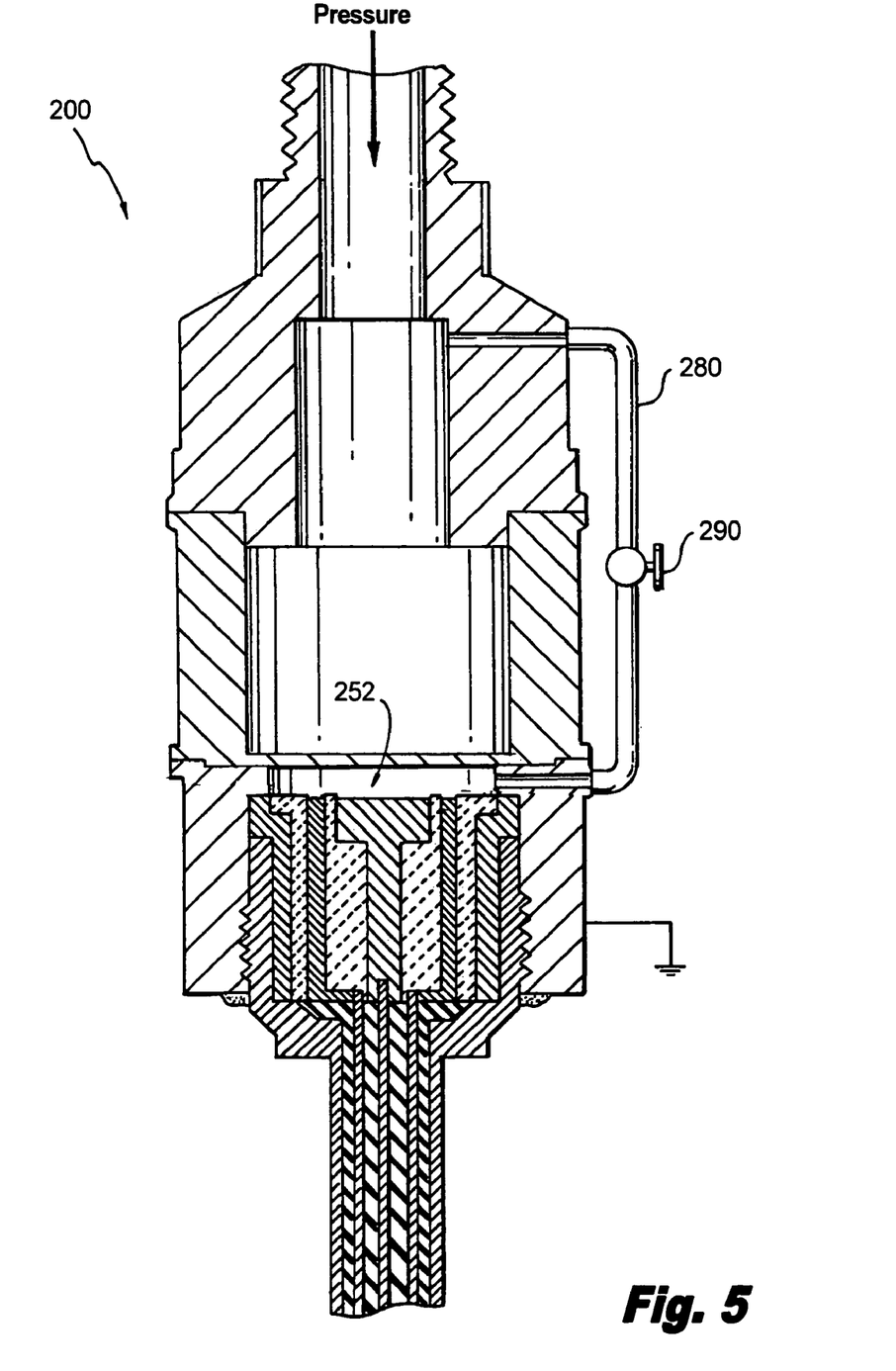
FIG. 5 is a cross sectional view of a further embodiment of the capacitive microphone of the present invention wherein the microphone includes a valve associated with the venting tube that extends between the pressure reference chamber and the pressure port.

FIG. 5 illustrates a further embodiment of the inventive microphone designated by reference numeral 200. Microphone 200 is similar in structure to microphone 100, with the exception that the vent tube 280 includes a valve mechanism 290. By blocking the vent tube 280 using the valve mechanism 290, the reference chamber 252 will be sealed with a reference pressure. It becomes an absolute pressure sensor as shown in FIG. 3. Using the devices described above, a small capacitance variation can be precisely measured and transmitted to a remote readout electronic circuit though a 3 meter long cable.

Capacitive microphone 100 of the present invention was tested using an acoustic generator that includes a 4" mini-subwoofer mounted on a plexiglass plate. A ½" pipe was used as a resonator. The resonator covered the frequency range from 170 Hz to 640 Hz. The pressure wave intensity increased in an approximately logarithmic fashion, with both frequency examples needing less than 5% of maximum system power to produce ±1 psi waves. Outputs as high as ±2.0 psi were sustained at rather low power input levels, with the power requirement rising as wave frequency rises (due to drop-off of driver efficiency with rising frequency). The output pressure was first calibrated with a PCB sensor mounted on the resonator. The capacitive microphone was then mounted on the same location and the output was normalized against the PCB data. The capacitive readout system was based on a remote readout system MC900 modular electronics by Fogale nanotech. The thermal drift was 0.002% per degree Celsius and the bandwidth was 10 kHz. Noise is about 0.5×10–6 pF RMS/sqrt(Hz).

By blocking the venting tube between the reference chamber and the sensing chamber, as shown in FIG. 5, the microphone was then calibrated using a highly accurate sensor system which is usually used to calibrate a static pressure sensor. The microphone's accuracy was then determined through a series of temperature cycling tests.

Figure 6:
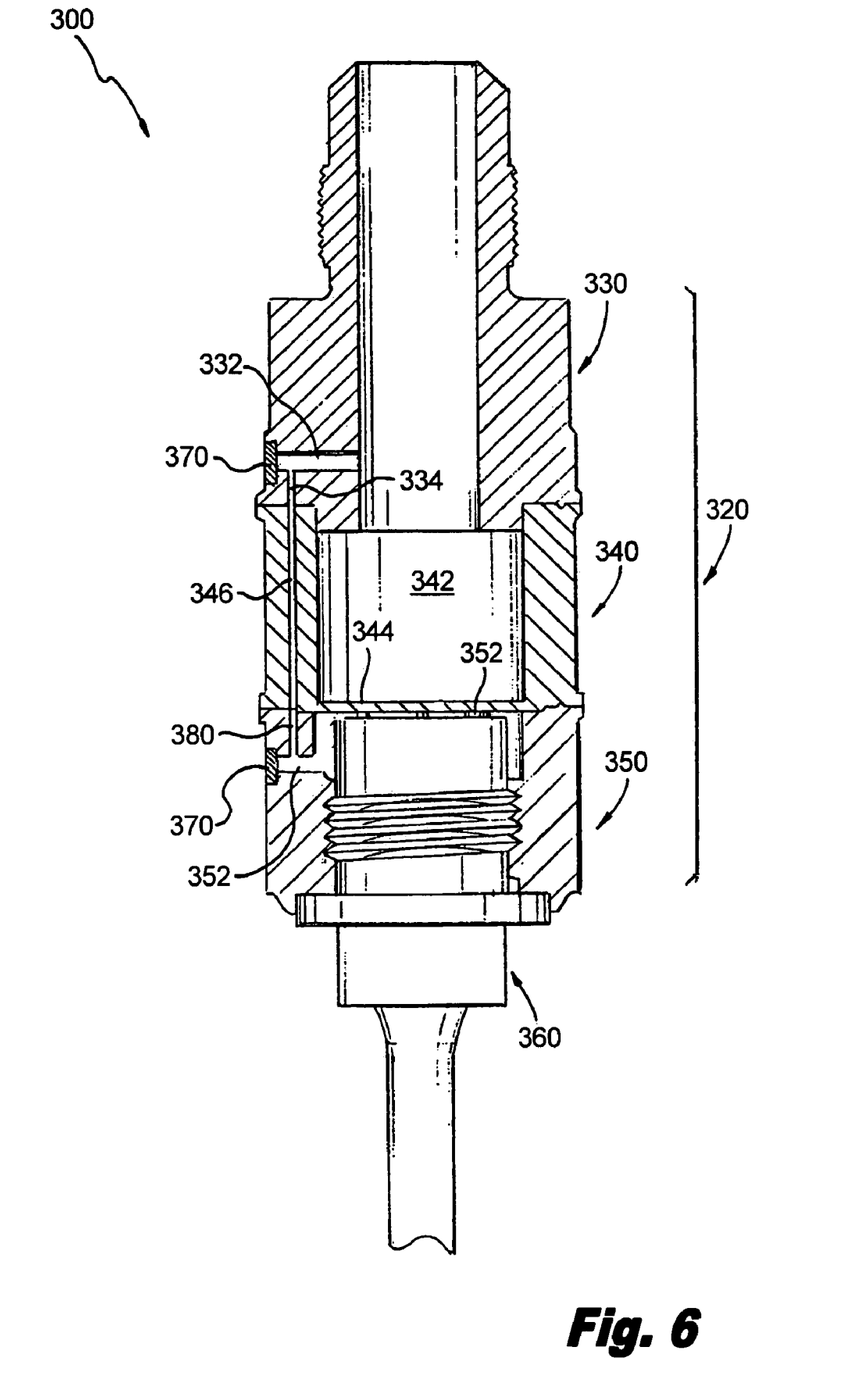
FIG. 6 is a cross sectional view of a further embodiment of the capacitive microphone of the present invention wherein the microphone includes a ventilation passage that extends between the pressure reference chamber and the pressure port.

Referring now to FIG. 6 which illustrates a further embodiment of the inventive microphone of the present application which has been designated by reference numeral 300. Like the previously described embodiments, microphone 300 includes a housing assembly 320 having a mounting section 330, a diaphragm section 340, and electrode support section 350. The electrode support section 350 is adapted and configured for receiving an electrode assembly 360.

However, unlike microphone 200, which includes an externally mounted vent tube 280, microphone 300 includes a ventilation port 380 formed within the housing assembly 320 of the microphone which extends between the sensing chamber 342 and the reference chamber 352. The ventilation port 380 maintains the pressure balance on both sides of the diaphragm 344.

The ventilation port 380 can be formed in three sections as shown in FIG. 6. Radially passages 332/352 are drilled into the mounting section 330 and the electrode support section 350, respectively, of the housing assembly 320. An axial passage 346 is drilled into the diaphragm section 340 which aligns with axial passages 334/354 formed in each of the mounting and electrode support sections. Blocking covers 370 can be used to seal off the ventilation port 380 from the exterior of the microphone 300.

Those skilled in the art will readily appreciate that a valve can be associated with the ventilation port 380 for restricting or eliminating the flow between the sensing chamber and the reference chamber.

Figure 11:
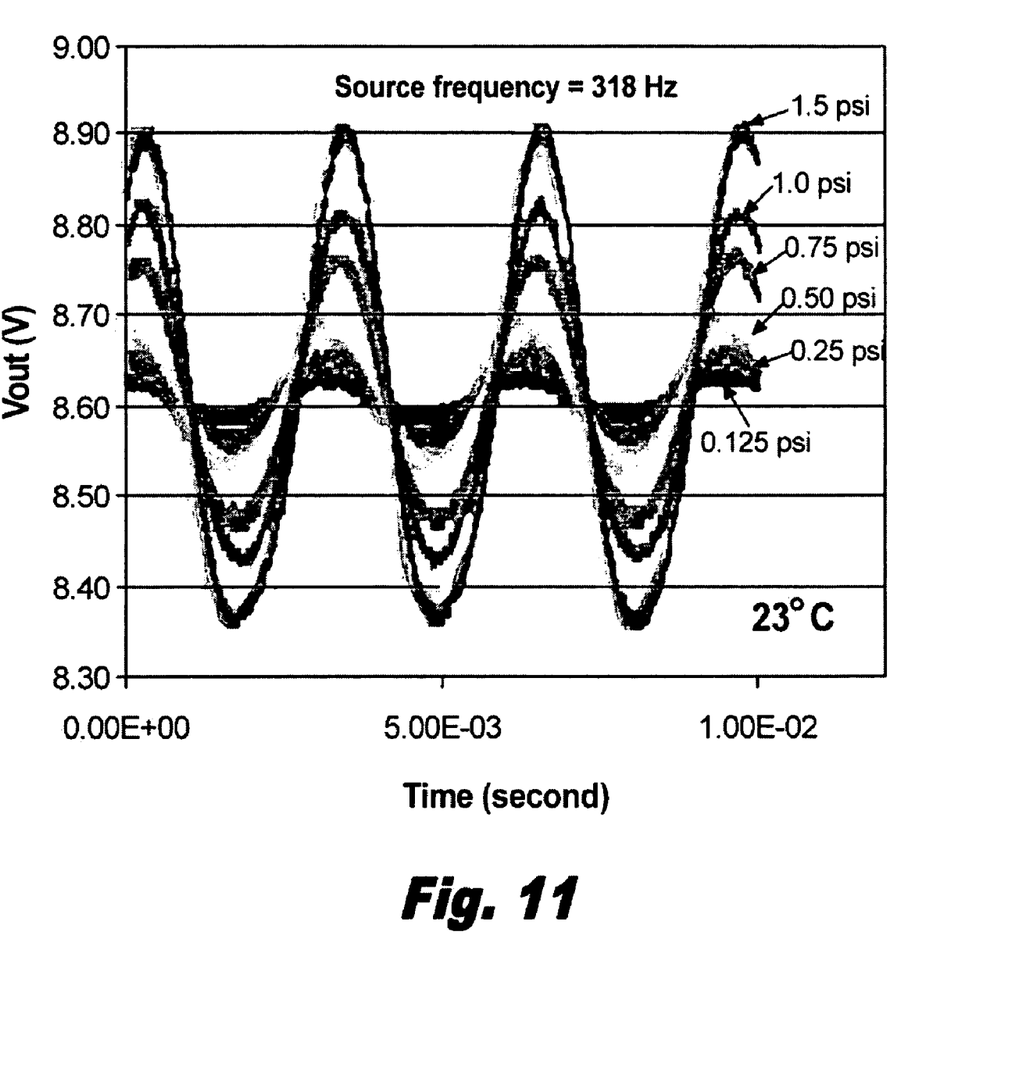
FIG. 11 is a graph showing sensor output versus acoustic pressure intensity (0.125 psi pk-to-pk to 1.5 psi pk-to-pk at 23° C.)
Figure 12:
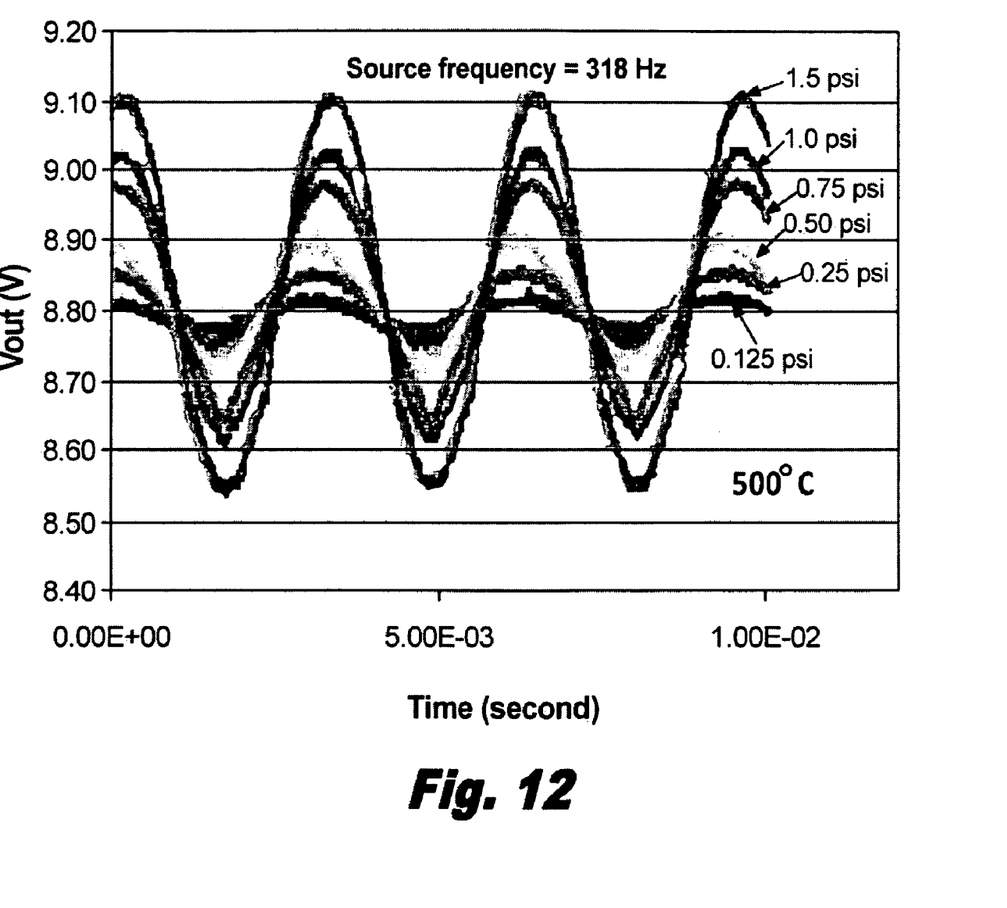
FIG. 12 is a graph showing sensor output versus acoustic pressure intensity (0.125 psi pk-to-pk to 1.5 psi pk-to-pk at 500° C.)
Figure 13:
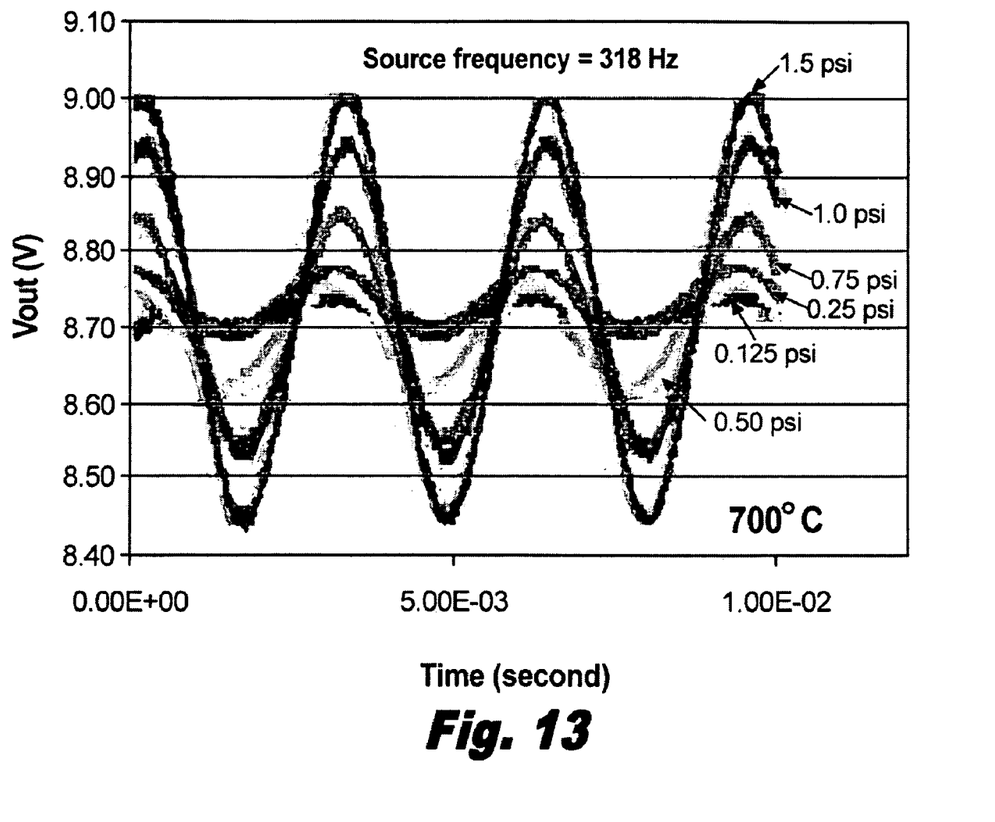
FIG. 13 is a graph showing sensor output versus acoustic pressure intensity (0.125 psi pk-to-pk to 1.5 psi pk-to-pk at 700° C.).

Typical sensor outputs versus different pressure wave intensities and temperatures are shown in FIGS. 11 through 13. The acoustic output frequency was fixed at 318 Hz, the acoustic pressure intensity was varied from 0.125 psi (pk-to-pk) to 1.5 psi (pk-to-pk), and temperature was changed from 23° C.→500° C.→700° C. The sensitivity of the microphone at different temperatures is listed in Table 5.0. The test results indicated that output of the capacitive microphone is not sensitive to temperature. However, there was a DC bias shifting over the temperature range. The bias changed from 8.63 V at 23° C. to 8.72 V at 700° C. Such a bias shifting can be reduced by running the sensor through multiple temperature cycles. The resolution was less than 0.035 psi. The sensor was able to respond to acoustic pressure at 750° C. By adjusting the gap thickness between the two electrode plates, the microphone works up to 800° C.

TABLE 5.0

Summary of the Performance of the Capacitive Microphone

| | Sensitivity pk-to-pk (mV/psi) | Maximum pressure (psi) |
|---|---|---|
| 23° C. | 360 | ±30 |
| 500° C. | 378 | ±25 |
| 700° C. | 380 | ±20 |

The testing concluded that a capacitive microphone constructed in accordance with the present invention is suitable for a temperature range of 23° C. to 800° C. The microphone is stable over a wide temperature range and the resolution is less than 0.035 psi. The bandwidth of the microphone system is greater than 1000 Hz.

While the subject invention has been described with respect to preferred embodiments, those skilled in the art will readily appreciate that changes and modifications may be made thereto without departing from the spirit and scope of the subject invention as defined by the appended claims.

What is claimed is:

1. A capacitive pressure sensor comprising: a sensor housing defining an interior sensing chamber having a pressure port and an interior reference chamber positioned adjacent to a sensing electrode, wherein the reference chamber is separated from the sensing chamber by a deflectable diaphragm made from Haynes 230 alloy, wherein the deflection of the diaphragm in response to an applied pressure in the sensing chamber corresponds to a change in capacitance value detected by the sensing electrode.

2. A capacitive pressure sensor as recited in claim 1, wherein a gap is provided within the reference chamber between the sensing electrode and the diaphragm, and the gap is between about 20 μm and 200 μm.

3. A capacitive pressure sensor as recited in claim 1, wherein the sensing electrode is shielded from signal line parasitic capacitance to ground.

4. A capacitive pressure sensor as recited in claim 3, wherein the sensing electrode is shielded from signal line parasitic capacitance to ground by a guard ring.

5. A capacitive pressure sensor as recited in claim 4, wherein the guard ring is driven by a voltage potential equal to a voltage potential running through the signal line.

6. A capacitive pressure sensor as recited in claim 5, wherein a ceramic insulator is disposed between the sensing electrode and guard ring.

7. A capacitive pressure sensor as recited in claim 1, further comprising means for reading a detected change in capacitance upon deflection of the diaphragm so as to obtain a pressure measurement.

8. A capacitive pressure sensor as recited in claim 1, wherein the reference chamber is sealed in a vacuum with a pressure less than 10 mTorr.

9. A capacitive pressure sensor as recited in claim 1, further comprising a venting conduit providing communication between the sensing chamber and the reference chamber.

10. A capacitive pressure sensor as recited in claim 9, wherein a valve is associated with the venting conduit for restricting the communication between the sensing chamber and the reference chamber.

11. A capacitive dynamic pressure microphone comprising:
  a) a sensor housing defining an interior sensing chamber having an open pressure port and an enclosed interior reference chamber accommodating a sensing electrode;
  b) a deflectable diaphragm separating the reference chamber from the sensing chamber and spaced apart from the sensing electrode by a predetermined gap distance; and
  c) a venting conduit providing communication between the sensing chamber and the reference chamber for maintaining a balanced static background pressure therebetween, and configured so that a change in pressure in the sensing chamber leads ahead of a corresponding change in pressure in the reference chamber by a predetermined time period, and wherein a pressure differential between the sensing chamber and the reference chamber over said time period causes a corresponding change in the deflection of the diaphragm over said time period, causing a corresponding change in the gap distance over said time period, resulting in a corresponding change in the capacitance value detected by the sensing electrode over said time period.

12. A capacitive pressure microphone as recited in claim 11, wherein the deflectable diaphragm is constructed from a material exhibiting high thermal strength, thermal stability and oxidation resistance at temperatures in excess of about 750° C.

13. A capacitive pressure microphone as recited in claim 11, wherein the deflectable diaphragm is constructed from a material exhibiting high thermal strength and thermal stability at temperatures up to about 1150° C.

14. A capacitive pressure microphone sensor as recited in claim 11, wherein the deflectable diaphragm is constructed from Haynes 230 alloy.

15. A capacitive pressure microphone as recited in claim 11, wherein a gap is provided within the reference chamber between the sensing electrode and the diaphragm, and the gap is between about 67 μm and 100 μm.

16. A capacitive pressure microphone as recited in claim 11, wherein the sensing electrode is shielded from signal line parasitic capacitance to ground.

17. A capacitive pressure microphone as recited in claim 16, wherein the sensing electrode is shielded from signal line parasitic capacitance to ground by a guard ring.

18. A capacitive pressure microphone as recited in claim 17, wherein the guard ring is driven by a voltage potential equal to a voltage potential running through the signal line.

19. A capacitive pressure microphone as recited in claim 18, wherein a ceramic insulator is disposed between the sensing electrode and guard ring.

20. A capacitive pressure microphone as recited in claim 11, further comprising means for reading a detected change in capacitance upon deflection of the diaphragm so as to obtain a pressure measurement.

21. A capacitive pressure microphone as recited in claim 11, further comprising a valve associated with the venting conduit for restricting the communication between the sensing chamber and the reference chamber.

22. A capacitive dynamic pressure microphone comprising:
  a) sensor housing including a mounting section, a diaphragm section and an electrode support section, the mounting section defining an open pressure port which communicates with an interior sensing chamber formed in the diaphragm section that terminates at a deflectable diaphragm, wherein the electrode support section accommodates a sensing electrode and defining a reference chamber, and wherein the deflectable diaphragm separates the reference chamber from the sensing chamber and is spaced apart from the sensing electrode by a predetermined gap distance; and
  b) a venting conduit providing communication between the sensing chamber and the reference chamber for maintaining a balanced static background pressure therebetween, and configured so that a change in pressure in the sensing chamber leads ahead of a corresponding change in pressure in the reference chamber by a predetermined time period.

23. A capacitive pressure microphone as recited in claim 22, wherein a pressure differential between the sensing chamber and the reference chamber over said time period causes a corresponding change in the deflection of the diaphragm over said time period, causing a corresponding change in the gap distance over said time period, resulting in a corresponding change in the capacitance value detected by the sensing electrode over said time period.

24. A capacitive pressure microphone as recited in claim 22, further comprising a valve associated with the venting conduit for restricting the communication between the sensing chamber and the reference chamber.

* * * * *